(12) United States Patent
Karreby et al.

(10) Patent No.: US 12,212,165 B2
(45) Date of Patent: Jan. 28, 2025

(54) ARRANGEMENT COMPRISING ENERGY STORAGE UNITS AND A RELATED METHOD

(71) Applicant: Hitachi Energy Ltd, Zürich (CH)

(72) Inventors: Per Karreby, Västerås (SE);
Jean-Philippe Hasler, Västerås (SE);
Mikael Tenerz, Västerås (SE); Mohsen Asoodar, Solna (SE); Lexuan Meng, Västerås (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/700,636

(22) PCT Filed: Oct. 13, 2021

(86) PCT No.: PCT/EP2021/078373
§ 371 (c)(1),
(2) Date: Apr. 11, 2024

(87) PCT Pub. No.: WO2023/061586
PCT Pub. Date: Apr. 20, 2023

(65) Prior Publication Data
US 2024/0339844 A1 Oct. 10, 2024

(51) Int. Cl.
*H02J 7/00* (2006.01)
(52) U.S. Cl.
CPC .......... *H02J 7/0016* (2013.01); *H02J 7/0029* (2013.01); *H02J 7/0063* (2013.01); *H02J 2207/50* (2020.01)
(58) Field of Classification Search
None
See application file for complete search history.

(56) References Cited

U.S. PATENT DOCUMENTS

| | | |
|---|---|---|
| 9,559,529 B1 | 1/2017 | Button et al. |
| 10,236,693 B1 | 3/2019 | Button et al. |

(Continued)

FOREIGN PATENT DOCUMENTS

| | | |
|---|---|---|
| CN | 101752844 A | 6/2010 |
| DE | 102013201909 A1 | 8/2014 |

(Continued)

OTHER PUBLICATIONS

International Search Report and Written Opinion for the corresponding PCT Application No. PCT/EP2021/078373 dated Jul. 7, 2022, 9 pages.

*Primary Examiner* — Jared Fureman
*Assistant Examiner* — Aqeel H Bukhari
(74) *Attorney, Agent, or Firm* — Procopio, Cory, Hargreaves & Savitch LLP

(57) ABSTRACT

An arrangement is disclosed, comprising a series connection of a plurality of energy storage units, a plurality of bypass circuits, each bypass circuit being configured to bypass a respective one of the energy storage units in the series connection, and a plurality of control modules, wherein each control module corresponds to a respective one of the bypass circuits. Each control module is configured to control operation of the corresponding bypass circuit and at least one other bypass circuit of the plurality of bypass circuits to selectively bypass the corresponding energy storage units in the series connection in such a way that operation of each bypass circuit of the plurality of bypass circuits to selectively bypass the corresponding energy storage unit in the series connection is controllable by means of at least two of the control modules. A related method is also disclosed.

14 Claims, 6 Drawing Sheets

(56) References Cited

U.S. PATENT DOCUMENTS

| | | |
|---|---|---|
| 2010/0261048 A1 | 10/2010 | Kim et al. |
| 2013/0015805 A1 | 1/2013 | Teggatz et al. |
| 2022/0060029 A1* | 2/2022 | Syouda ............... H02J 7/00712 |
| 2022/0060030 A1* | 2/2022 | Ono ................. G01R 19/16542 |

FOREIGN PATENT DOCUMENTS

| | | |
|---|---|---|
| EP | 1414129 A2 | 4/2004 |
| EP | 1414129 A3 | 7/2004 |
| WO | 2017/079040 A1 | 5/2017 |

* cited by examiner

ARRANGEMENT COMPRISING ENERGY STORAGE UNITS AND A RELATED METHOD

The present application is a national stage entry of International Patent Application No. PCT/EP2021/078373, filed on Oct. 13, 2021, the disclosures of which are hereby incorporated herein by reference as if set forth in full.

TECHNICAL FIELD

The present invention generally relates to energy storage systems. More specifically, the present invention relates to an arrangement comprising several energy storage units, e.g., comprising or being constituted by capacitors, and a related method.

BACKGROUND

An energy storage system may be constructed as a string of interconnected energy storage (ES) units in order to attain relatively high voltage, power and energy ratings. In general, each ES unit in such a string has an associated controller and/or communication unit (which may be referred to as input/output unit). Each controller may be configured to control operation of the corresponding ES unit. However, a string forming a large number of series connected ES units may result in relatively low operational reliability of the energy storage system, since failure in a single one of the ES units in the series connection of ES units or in the controller and/or communication unit of the ES unit may result in failure of the whole string.

SUMMARY

For an energy storage system constructed as a string of interconnected (e.g., series connected) ES units, there is usually provided a protection circuit for each ES unit, which protection circuit may have the capability of selectively isolating and/or bypassing the corresponding ES unit. Operation of the protection circuit is usually controlled by means of the controller and/or communication unit corresponding to the ES unit with which the protection circuit is associated. By way of such capability, in case there is a fault in one of the ES units, the faulty ES unit may be isolated and/or bypassed by means of the corresponding protection circuit. In that way, the remaining (non-faulty) ES units in the string can be kept operational even though one of the ES units is faulty. However, in case there would be a fault in one of the ES units and at the same time a fault in the corresponding controller and/or communication unit, failure of the whole string may result. This is due to that operation of the protection circuit corresponding to the faulty ES unit is generally controlled by the controller and/or communication unit corresponding to the ES unit. Thus, in case there would be a fault in one of the ES units and at the same time a fault in the corresponding controller and/or communication unit, the whole string might have to be de-energized. This results in a risk of not fulfilling reliability and availability requirements of the energy storage system, especially in case the string includes a very large number of series connected ES units.

In view of the foregoing, a concern of the present invention is to, in relation to an energy storage system constructed as a string of interconnected (e.g., series connected) ES units, achieve a relatively high operational reliability of the energy storage system.

A further concern of the present invention is to, in relation to such an energy storage system, reduce or even avoid the risk of failure of the whole string in case there would be a fault in one of the ES units and at the same time a fault in the corresponding controller and/or communication unit.

To address at least one of these concerns and other concerns, an arrangement and a method in accordance with the independent claims are provided. Preferred embodiments are defined by the dependent claims.

According to a first aspect of the present invention, an arrangement is provided. The arrangement may comprise a series connection of a plurality of energy storage units. The arrangement may comprise a plurality of bypass circuits. Each bypass circuit may be configured to bypass a respective one of the energy storage units in the series connection. The arrangement may comprise a plurality of control modules. Each control module may correspond to a respective one of the bypass circuits. Each control module may be configured to control operation of the corresponding bypass circuit and at least one other bypass circuit of the plurality of bypass circuits to selectively bypass the corresponding energy storage units in the series connection in such a way that operation of each bypass circuit of the plurality of bypass circuits to selectively bypass the corresponding energy storage unit in the series connection is controllable by means of at least two of the control modules.

According to a second aspect of the present invention, a method is provided. The arrangement may comprise a series connection of a plurality of energy storage units. The arrangement may comprise a plurality of bypass circuits. Each bypass circuit may be configured to bypass a respective one of the energy storage units in the series connection. The arrangement may comprise a plurality of control modules. Each control module may correspond to a respective one of the bypass circuits. The method may comprise each control module controlling operation of the corresponding bypass circuit and at least one other bypass circuit of the plurality of bypass circuits to selectively bypass the corresponding energy storage units in the series connection (e.g., if there is a fault in the energy storage units) in such a way that operation of each bypass circuit of the plurality of bypass circuits to selectively bypass the corresponding energy storage unit in the series connection is controllable by means of at least two of the control modules. By each control module controlling operation of the corresponding bypass circuit and at least one other bypass circuit of the plurality of bypass circuits to selectively bypass the corresponding energy storage units in the series connection, it may be meant that each control module may control operation of the corresponding bypass circuit and/or the at least one other bypass circuit of the plurality of bypass circuits to selectively bypass the corresponding energy storage unit(s) in the series connection if required or desired, e.g., if there is a fault in one or more of those energy storage units.

By means of each control module being configured to control operation of the corresponding bypass circuit and at least one other bypass circuit of the plurality of bypass circuits to selectively bypass the corresponding energy storage units in the series connection—in such a way that operation of each bypass circuit of the plurality of bypass circuits to selectively bypass the corresponding energy storage unit in the series connection is controllable by means of at least two of the control modules-a relatively high operational reliability of the series connection of energy storage units may be achieved. In case there would be a fault in one of the energy storage units, the corresponding bypass circuit may be controlled so as to bypass the faulty energy storage unit in the series connection. Also, in case there at the same time would be a fault in the control module corresponding to that bypass circuit (such that the control module is unable to control operation of that bypass circuit to bypass the faulty energy storage unit in the series connection), there is still at least one other control module of the plurality of control modules that is able to control operation of the bypass circuit corresponding to the faulty energy storage unit to bypass it in the series connection. Thereby, the risk of failure of the whole series connection of energy storage units, in case there would be a fault in one of the energy storage units and at the same a fault in the control module corresponding to the bypass circuit corresponding to the faulty energy storage unit, may be reduced or even avoided.

Each of any energy storage unit may for example comprise or consist of an electrical energy storage unit. Each energy storage unit may be capable of selectively being charged with electrical energy supplied to the energy storage unit and selectively discharge electrical energy stored in the energy storage unit. Each or any energy storage unit may for example comprise or consist of one or more batteries, capacitors and/or ultracapacitors. Each or any of the (electrical) energy storage units could in alternative be referred to as an (electrical) energy storage cell.

Each or any bypass circuit may for example comprise one or more switches (e.g., one or more solid-state switches) and possibly one or more resistors.

Each control module may be configured to control operation of the corresponding bypass circuit to selectively bypass the corresponding energy storage unit in the series connection on a condition that there is a fault in the energy storage unit (and possibly also on a condition that there is not a fault in the control module).

For each control module, if there is a fault in the control module and there is not a fault in at least one of the other control module(s) also capable of controlling operation of the bypass circuit to selectively bypass the corresponding energy storage unit in the series connection, the at least one other control module may be configured to control operation of the bypass circuit to selectively bypass the energy storage unit in the series connection (e.g., instead of the control module in which there is a fault).

The arrangement may comprise at least one fault sensor, which may be configured to sense whether there is a fault in any one of the energy storage units and/or in any one of the control modules. The at least one fault sensor may possibly not be comprised in the arrangement, but may instead be separate from and connected to the arrangement.

Each control module may comprise at least a control unit and a switching device.

For each control module, the control unit of the control module may be configured to control operation of the bypass circuit corresponding to the control module to selectively bypass the energy storage unit corresponding to the bypass circuit in the series connection by means of transmitting at least one control signal to the bypass circuit.

For each control module, the switching device of the control module may be configured to selectively convey any control signal, from a control unit of at least one of the other control module(s) also capable of controlling operation of said bypass circuit to selectively bypass the energy storage unit corresponding to said bypass circuit in the series connection, to said bypass circuit to control operation thereof to selectively bypass the energy storage unit corresponding to said bypass circuit in the series connection.

For each or any control module, the switching device of the control module may for example comprise or be constituted by at least one electromechanical relay and/or at least one solid-state relay.

For each control module, the control unit of the control module may be configured to control operation of the bypass circuit corresponding to the control module to selectively bypass the energy storage unit corresponding to the bypass circuit in the series connection by means of transmitting at least one control signal to the bypass circuit on a condition that there is a fault in the energy storage unit (and possibly also on a condition that there is not a fault in the control unit of the control module).

For each control module, if there is a fault in the control unit of the control module and there is not a fault in the control unit of at least one of the other control module(s) also capable of controlling operation of the bypass circuit to selectively bypass the corresponding energy storage unit in the series connection, the control unit of the at least one other control module may be configured to control operation of the bypass circuit to selectively bypass the energy storage unit in the series connection by means of transmitting at least one control signal to the bypass circuit via the switching device of the control module corresponding to said bypass circuit (e.g., instead of the control unit in which there is a fault).

In the context of the present application, "control signal", or "control signaling", may be an object used to transmit or convey information, commands, messages, etc., and/or a detectable physical quantity or impulse (such as a voltage or current) by which information, commands, messages, etc., can be transmitted.

Each or any of the control modules and/or control units may for example include or be constituted by any suitable central processing unit (CPU), microcontroller, digital signal processor (DSP), Application Specific Integrated Circuit (ASIC), Field Programmable Gate Array (FPGA), etc., or any combination thereof. Each or any of the control modules and/or control units may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid-state memory or a remotely mounted memory, or any combination thereof.

The arrangement may comprise at least one fault sensor (e.g., the at least one fault sensor as mentioned in the foregoing), which may be configured to sense whether there is a fault in any one of the energy storage units and/or in any one of the control units. The at least one fault sensor may possibly not be comprised in the arrangement, but may instead be separate from and connected to the arrangement.

The at least one fault sensor may for example comprise at least one fault sensor as known in the art for sensing whether there is a fault in any one of the energy storage units and/or in any one of the control modules (or control units). The at least one fault sensor may be configured to sense (e.g., monitor) one or more characteristics or quantities, etc., at least indicative of operation or state of health of each or any of the energy storage units and/or control modules (or control units), and compare the sensed characteristic(s), quantity or quantities, etc. to a selected (e.g., predefined) threshold value for the characteristic(s), quantity or quantities, etc. For example, for each energy storage unit or control module (or control unit), in case the sensed characteristic(s), quantity or quantities, etc., exceeds or exceed the selected threshold, the at least one fault sensor may determine that there is a fault in the energy storage unit or control module (or control unit). For example, the at least one fault sensor may be configured to sense (e.g., monitor) voltage and/or temperature of each or any of the energy storage units.

The series connection of the plurality of energy storage units may form a succession of energy storage units. For each control module, the at least one other bypass circuit which the control module is configured to control operation of may be the bypass circuit(s) corresponding to energy storage unit(s) immediately preceding and/or immediately following the energy storage unit in the succession energy storage units that is corresponding to the bypass circuit which corresponds to the control module. Stated differently, for each control module, the at least one other bypass circuit which the control module is configured to control operation of may be the bypass circuit(s) corresponding to energy storage unit(s) that is/are neighboring the energy storage unit in the succession of energy storage units that is corresponding to the bypass circuit which corresponds to the control module.

For each energy storage unit, the energy storage unit, the bypass circuit corresponding to said energy storage unit and the control module corresponding to said bypass circuit may define an assembly of the arrangement. Thereby, the arrangement may comprise a plurality of assemblies, wherein each assembly may comprise an energy storage unit, a bypass circuit and a control module.

The arrangement may comprise at least one auxiliary power supply, or a plurality of auxiliary power supplies. Each auxiliary power supply may be connected to at least one of the assemblies for selectively supplying power to the energy storage unit(s) of the at least one of the assemblies.

There may be a difference in voltage potential of the assemblies which have a control module capable of controlling operation of a given bypass circuit to selectively bypass the corresponding energy storage unit in the series connection. Such a difference in voltage potential could possibly render direct electrical control connection between those assemblies difficult or even impossible. Embodiments of the present invention are addressing this possible issue. For example, since the assemblies may be working at different potentials, it may be difficult or infeasible to use a direct electrical link or connection between the assemblies for activating or operating the switching devices.

Each assembly may have a potential in relation to a reference potential.

For each bypass circuit, all of the assemblies having a control module capable of controlling operation of the bypass circuit to selectively bypass the corresponding energy storage unit in the series connection may have the same reference potential.

As mentioned, the arrangement may comprise a plurality of auxiliary power supplies.

Each auxiliary power supply may be connected to at least one of the assemblies for selectively supplying power to the energy storage unit(s) of the at least one of the assemblies. For each bypass circuit, all of said assemblies having a control module capable of controlling operation of the bypass circuit to selectively bypass the corresponding energy storage unit in the series connection and have the same reference potential may be connected to the same auxiliary power supply.

In alternative, each auxiliary power supply may be connected to a respective one of the assemblies, e.g., only to a respective one of the assemblies.

In alternative or in addition, for each control module, the switching device of the control module may comprise or be constituted by at least one solid-state relay, in order to attain isolation (e.g., a sufficient isolation) between control signaling from different control modules or control units.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

Each of FIGS. 1 to 6 is a schematic view of an arrangement according to one or more embodiments of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
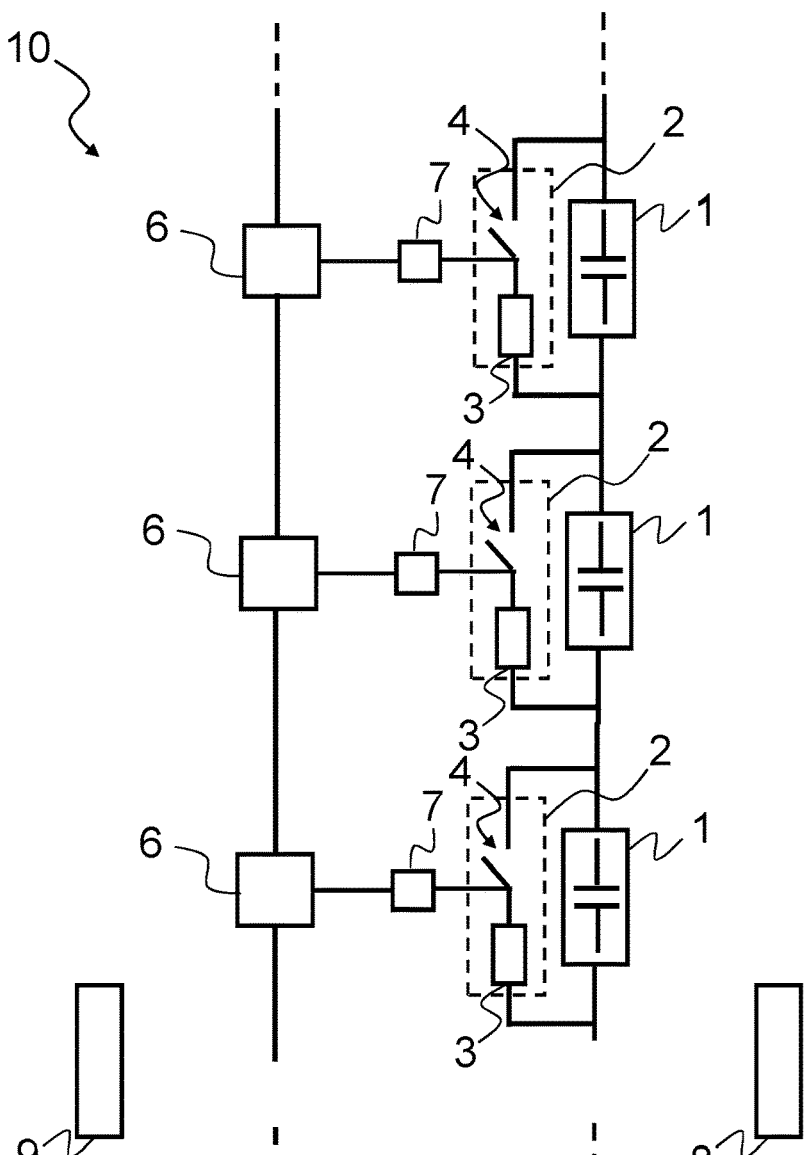
Figure 1:
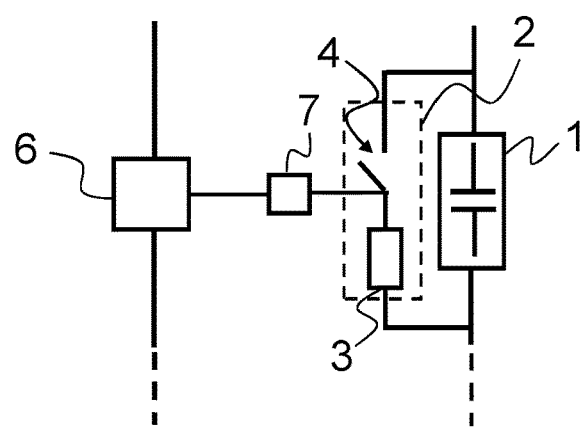

FIG. 1 is a schematic view of an arrangement 10 according to an embodiment of the present invention.

The arrangement 10 comprises a series connection of a plurality of energy storage units 1. It is to be understood that only some of the energy storage units 1 are depicted in FIG. 1. It is also to be understood that the number of energy storage units 1 illustrated in FIG. 1 is according to an example, and that the arrangement 10 may comprise fewer or more energy storage units than illustrated in FIG. 1.

The energy storage units 1 may for example comprise or consist of electrical energy storage units, and may be referred to as such herein with no loss of generality. Each energy storage unit 1 may be capable of selectively being charged with electrical energy supplied to the energy storage unit 1 and to selectively discharge electrical energy stored in the energy storage unit. As indicated in FIG. 1, each energy storage unit may for example comprise or consist of one or more capacitors and/or ultracapacitors.

The arrangement 10 comprises a plurality of bypass circuits 2. Each bypass circuit 2 is configured to bypass a respective one of the energy storage units 1 in the series connection. It is to be understood that only some of the bypass circuits 2 are depicted in FIG. 1. It is also to be understood that the number of bypass circuits 2 illustrated in FIG. 1 is according to an example, and that the arrangement 10 may comprise fewer or more bypass circuits than illustrated in FIG. 1.

Each or any bypass circuit 2 may comprise a switch 4 (e.g., a solid-state switch, for example comprising one or more insulated-gate bipolar transistors) and a resistor 3. For each bypass circuit 2, by closing the switch 4, the corresponding energy storage unit 1 may be bypassed in the series connection. It is to be understood that the configuration of the bypass circuits illustrated in the figures is according to an example, and that other configurations providing a functionality to bypass the respective ones of the energy storage units are possible. It is further to be understood that for each or any bypass circuit 2, its resistor 3 may or may not be a physical resistor, i.e. an actual resistive component arranged in the bypass circuit 2, and that the resistor 3 may represent internal resistance of the switch 4 when conducting or of any another component in the bypass circuit 2 (e.g., a busbar; not illustrated in the figures).

The arrangement 10 comprises a plurality of control modules, each of which in the following will be collectively referred to by reference numerals 6, 7. In accordance with the embodiment illustrated in FIG. 1, each control module 6, 7 comprises a control unit 6 and a switching device 7. However, this is not required, and other implementations or realizations of the control modules 6, 7 are possible.

For each control module 6, 7, the switching device 7 of the control module 6, 7 may for example comprise or be constituted by one or more relays, such as, for example, at least one electromechanical relay and/or at least one solid-state relay. However, it is to be understood that the switching devices 7 are not limited thereto and that other type(s) of switching devices may be used.

Each control module 6, 7 corresponds to a respective one of the bypass circuits 2. It is to be understood that only some of the control modules 6, 7 are depicted in FIG. 1. It is also to be understood that the number of control modules 6, 7 illustrated in FIG. 1 is according to an example, and that the arrangement 10 may comprise fewer or more control modules than illustrated in FIG. 1.

Each control module 6, 7 is configured to control operation of the corresponding bypass circuit 2 and at least one other bypass circuit 2 of the plurality of bypass circuits 2 to selectively bypass the corresponding energy storage units 1 in the series connection in such a way that operation of each bypass circuit 2 of the plurality of bypass circuits 2 to selectively bypass the corresponding energy storage unit 1 in the series connection is controllable by means of at least two of the control modules 6, 7.

As illustrated in FIG. 1, the series connection of the plurality of energy storage units 1 may form a succession of energy storage units 1. For each control module 6, 7, the at least one other bypass circuit 2 which the control module 6, 7 is configured to control operation of may be the bypass circuit(s) 2 corresponding to energy storage unit(s) 1 immediately preceding and/or immediately following the energy storage unit 1 in the succession of energy storage units 1 that is corresponding to the bypass circuit 2 which corresponds to the control module 6, 7. Stated differently, for each control module 6, 7, the at least one other bypass circuit 2 which the control module 6, 7 is configured to control operation of may be the bypass circuit(s) 2 corresponding to energy storage unit(s) 1 that is/are neighboring the energy storage unit 1 in the succession of energy storage units 1 that is corresponding to the bypass circuit 2 which corresponds to the control module 6, 7. However, this is not required, and other implementations or realizations (e.g., non-neighboring) are possible.

In accordance with the embodiment illustrated in FIG. 1, each control module 6, 7 may be configured to control operation of the corresponding bypass circuit 2 and at least one other bypass circuit 2 of the plurality of bypass circuits 2 to selectively bypass the corresponding energy storage units 1 in the series connection by controlling operation of the switches 4 of the said bypass circuits 2.

In accordance with the embodiment illustrated in FIG. 1, for each control module 6, 7, the control unit 6 of the control module 6, 7 is configured to control operation of the bypass circuit 2 corresponding to the control module 6, 7 to selectively bypass the energy storage unit 1 corresponding to the bypass circuit 2 in the series connection by means of transmitting at least one control signal to the bypass circuit 2. The switching device 7 of the control module 6, 7 is configured to selectively convey any control signal, from a control unit 6 of at least one of the other control module(s) 6, 7 also capable of controlling operation of said bypass circuit 2 to selectively bypass the energy storage unit 1 corresponding to said bypass circuit 2 in the series connection, to said bypass circuit 2 to control operation thereof to selectively bypass the energy storage unit 1 corresponding to said bypass circuit 2 in the series connection. In this way, each control module 6, 7 is configured to control operation of the corresponding bypass circuit 2 and at least one other bypass circuit 2 of the plurality of bypass circuits 2 to selectively bypass the corresponding energy storage units 1 in the series connection in such a way that operation of each bypass circuit 2 of the plurality of bypass circuits 2 to selectively bypass the corresponding energy storage unit 1 in the series connection is controllable by means of at least two of the control modules 6, 7. However, other ways of realizing or implementing such capability (e.g., with another or other types of control modules than illustrated in FIG. 1) are possible.

Possibly, each or any bypass circuit may comprise several switches, even though each of the figures only illustrate a single switch 4 in each bypass circuit. By an appropriate arrangement of several switches in a bypass circuit, such as, for example, four or more switches, there may be provided a functionality of the bypass circuit to selectively reverse the polarity of the energy storage unit corresponding to the bypass circuit. In such a case, at least two switches of the bypass circuit in an appropriate arrangement may be needed for providing a capability of the bypass circuit to selectively bypass the corresponding energy storage unit.

The arrangement 10 may comprise at least one fault sensor, which may be configured to sense whether there is a fault in any one of the energy storage units 1 and/or in any one of the control units 6 (or, more generally, in any one of the control modules 6, 7).

In accordance with the embodiment illustrated in FIG. 1, the arrangement 10 comprises two fault sensors, schematically indicated at 8, 9, which may be referred to as a first fault sensor 8 and a second fault sensor 9. The first fault sensor 8 may be configured to sense (e.g., monitor) whether there is a fault in any one of the energy storage units 1. The second fault sensor 9 may be configured to sense (e.g., monitor) whether there is a fault in any one of the control units 6 (or, more generally, in any one of the control modules 6, 7). The functionalities of the first fault sensor 8 and the second fault sensor 9 might be combined in a single fault sensor, which hence could be configured to sense (e.g., monitor) whether there is a fault in any one of the energy storage units 1 and to sense (e.g., monitor) whether there is a fault in any one of the control units 6 (or, more generally, in any one of the control modules 6, 7).

The arrangement 10 may comprise or be connected to some other entity (e.g., a module or unit; not shown in FIG.

1) that may sense (e.g., monitor) a state of one or more other components of the arrangement 10. Possibly, the functionality of such an entity could be implemented in any of the above-mentioned fault sensors. For example, a state (e.g., open or closed, or conducting or non-conducting) of the switch 4 of each or any of the bypass circuits 2 may be sensed or monitored by such an entity, e.g., to keep track of which, if any, of the energy storage units 1 that are bypassed in the series connection.

Figure 2:
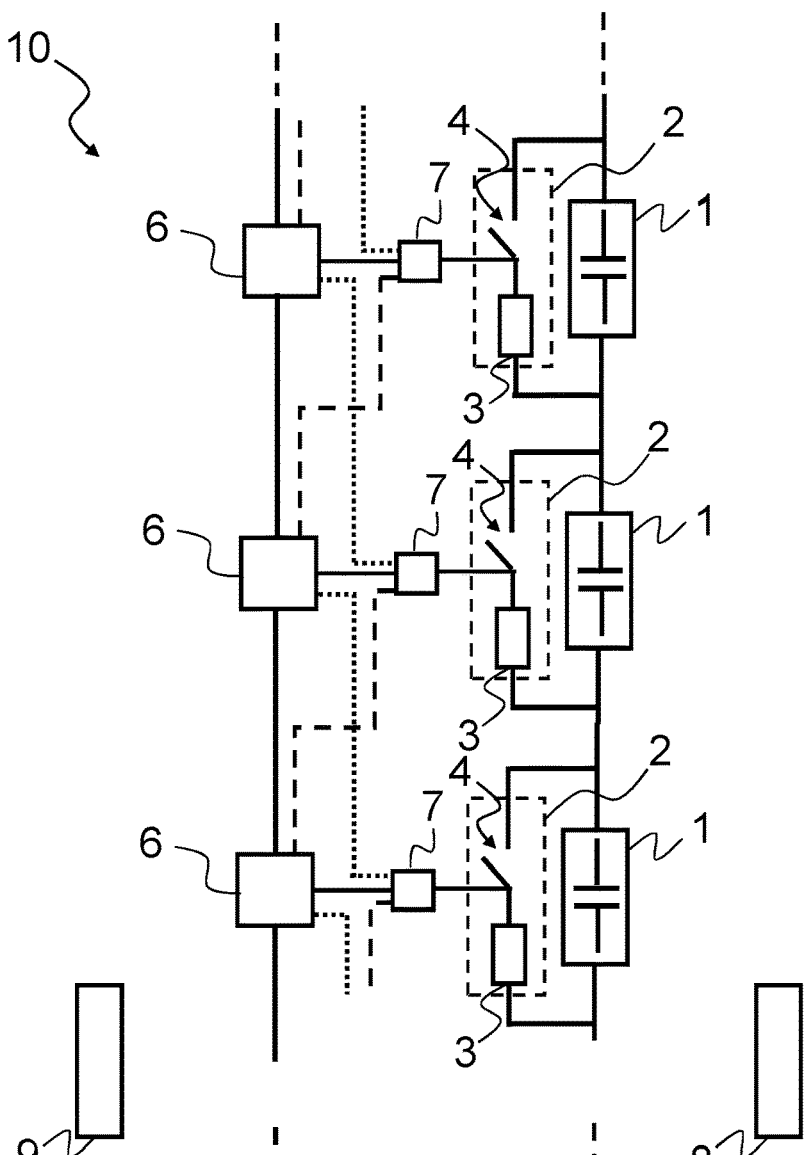
Figure 2:
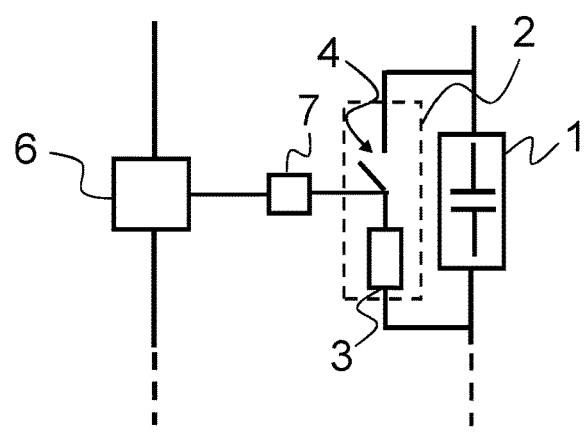

For each control module 6, 7, the control unit 6 of the control module 6, 7 may be configured to control operation of the bypass circuit 2 corresponding to the control module 6, 7 to selectively bypass the energy storage unit 1 corresponding to the bypass circuit 2 in the series connection by means of transmitting at least one control signal to the bypass circuit 2 on a condition that there is a fault in the energy storage unit 1, and possibly also on a condition that there is not a fault in the control unit 6 of the control module 6, 7. If there is a fault in the control unit 6 of the control module 6, 7 and there is not a fault in the control unit 6 of at least one of the other control module(s) 6, 7 also capable of controlling operation of the bypass circuit 2 to selectively bypass the corresponding energy storage unit 1 in the series connection, the control unit 6 of the at least one other control module 6, 7 may be configured to control operation of the bypass circuit 2 to selectively bypass the energy storage unit 1 in the series connection by means of transmitting at least one control signal to the bypass circuit 2 via the switching device 7 of the control module 6, 7 corresponding to said bypass circuit 2 (e.g., instead of the control unit 6 in which there is a fault). This signaling is illustrated in FIG. 2, where an example of control signaling paths has been illustrated. Thus, FIG. 2 illustrates the arrangement 10 illustrated in FIG. 1 and additionally illustrates an example of control signaling paths between the control units 6 and bypass circuits 2.

An example of control signaling paths between the control units 6 and bypass circuits 2 with respect to the three uppermost energy storage units 1 in FIG. 2 is illustrated in FIG. 2.

As illustrated in FIG. 2, each control unit 6 may control operation of the bypass circuit 2 that corresponds to the control module 6, 7 in which the control unit 6 is included by means of transmitting at least one control signal to that bypass circuit 2. The at least one control signal is, in accordance with the embodiments illustrated in FIGS. 1 and 2, conveyed to that bypass circuit 2 via the switching device 7 of the control module 6, 7 corresponding to that bypass circuit 2. However, the at least one control signal could be conveyed to that bypass circuit 2 in a different way, e.g., directly from the control unit 6 to the bypass circuit 2. This control signaling path is illustrated by the solid lines between the control units 6 and their corresponding bypass circuits 2 (via the switching devices 7). As illustrated in FIG. 2 as well as FIG. 1, the switching device 7 of each control module 6, 7 is connected to the bypass circuit 2 that corresponds to the control module 6, 7.

Further, as also illustrated in FIG. 2, each control unit 6 may also control operation of two other bypass circuits 2 other than the bypass circuit 2 that corresponds to the control module 6, 7 in which the control unit 6 is included, by means of transmitting at least one control signal to the two other bypass circuits 2 via the switching device 7 of the control module 6, 7 corresponding to the respective ones of the two other bypass circuits 2. These control signaling paths are illustrated by the dashed and dotted lines between the control units 6 and the switching devices 7 in FIG. 2.

Thus, by means of the control signaling paths illustrated in FIG. 2, for each control module 6, 7, the control unit 6 of the control module 6, 7 may be configured to control operation of the bypass circuit 2 corresponding to the control module 6, 7 to selectively bypass the energy storage unit 1 corresponding to the bypass circuit 2 in the series connection by means of transmitting at least one control signal to the bypass circuit 2. The switching device 7 of the control module 6, 7 may be configured to selectively convey any control signal, from a control unit 6 of at least one of the two other control modules 6, 7 also capable of controlling operation of said bypass circuit 2 to selectively bypass the energy storage unit 1 corresponding to said bypass circuit 2 in the series connection, to said bypass circuit 2 to control operation thereof to selectively bypass the energy storage unit 1 corresponding to said bypass circuit 2 in the series connection.

Figure 3:
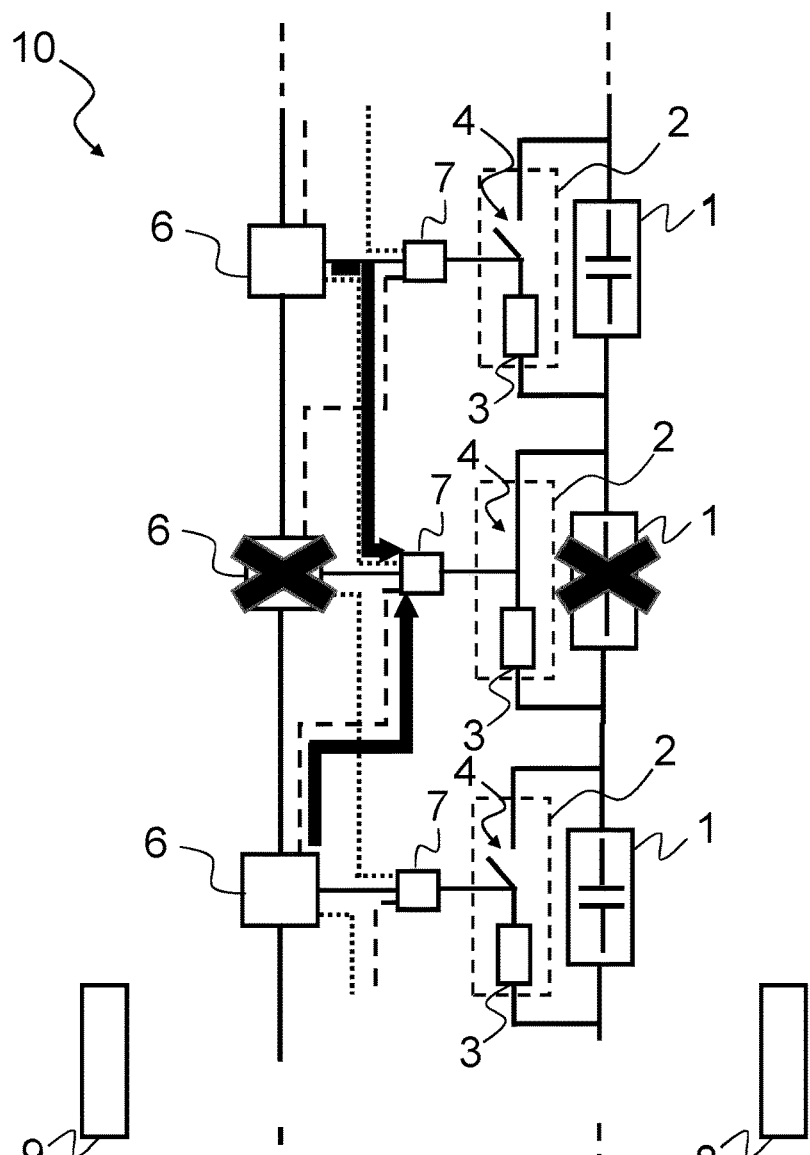
Figure 3:
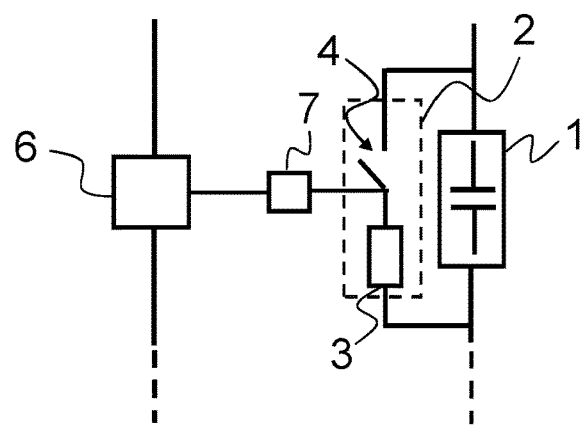

FIG. 3 illustrates the arrangement 10 illustrated in FIGS. 1 and 2, and additionally illustrates an example of control signaling paths in case of a fault in one of the energy storage units 1 and at the same time a fault in the control unit 6 of the control module 6, 7 corresponding to the bypass circuit 2 that is corresponding to the faulty energy storage unit 1. In such a case, the control module 6, 7 may be unable to control operation of that bypass circuit 2 to bypass the faulty energy storage unit 1 in the series connection. The two crosses in FIG. 3 indicate the faulty energy storage unit 1 and the faulty control unit 6. If the bypass circuit 2 that is corresponding to the faulty energy storage unit 1 would not be controllable by any of the other control modules 6, 7 or control units 6, there would be a greater risk of failure of the whole series connection of energy storage units 1 and for the whole series connection of energy storage units 1 to have to be de-energized.

However, as illustrated in FIG. 3, by means of one or more embodiments of the present invention, the bypass circuit 2 that is corresponding to the faulty energy storage unit 1 is also controllable by means of the control modules 6, 7 or control units 6 associated with the two bypass units 2 that are neighboring the bypass circuit 2 that is corresponding to the faulty energy storage unit 1. The solid black arrows in FIG. 3 indicate the two control signaling paths from the two control units 6 associated with the two bypass units 2 that are neighboring the bypass circuit 2 that is corresponding to the faulty energy storage unit 1 to the bypass circuit 2 that is corresponding to the faulty energy storage unit 1, both of which two control signaling paths go via the switching device 7 of the control module 6, 7 corresponding to the bypass circuit 2 that is corresponding to the faulty energy storage unit 1. As illustrated in FIG. 3, by means of any of the two control signaling paths, the switch 4 of the bypass unit 2 can be closed, thereby bypassing the faulty energy storage unit 1 in the series connection, even though there is a fault in the control unit 6 of the control module 6, 7 corresponding to the bypass circuit 2 that is corresponding to the faulty energy storage unit 1. Thereby, the rest of the energy storage units 1 in the series connection can keep operating.

For each energy storage unit 1, the energy storage unit 1, the bypass circuit 2 corresponding to said energy storage unit 1 and the control module 6, 7 corresponding to said bypass circuit 2 may define an assembly of the arrangement 10, such that the arrangement 10 may comprise a plurality of assemblies. Thus, each such assembly may comprise an energy storage unit 1, a bypass circuit 2 and a control module 6, 7.

Figure 4:
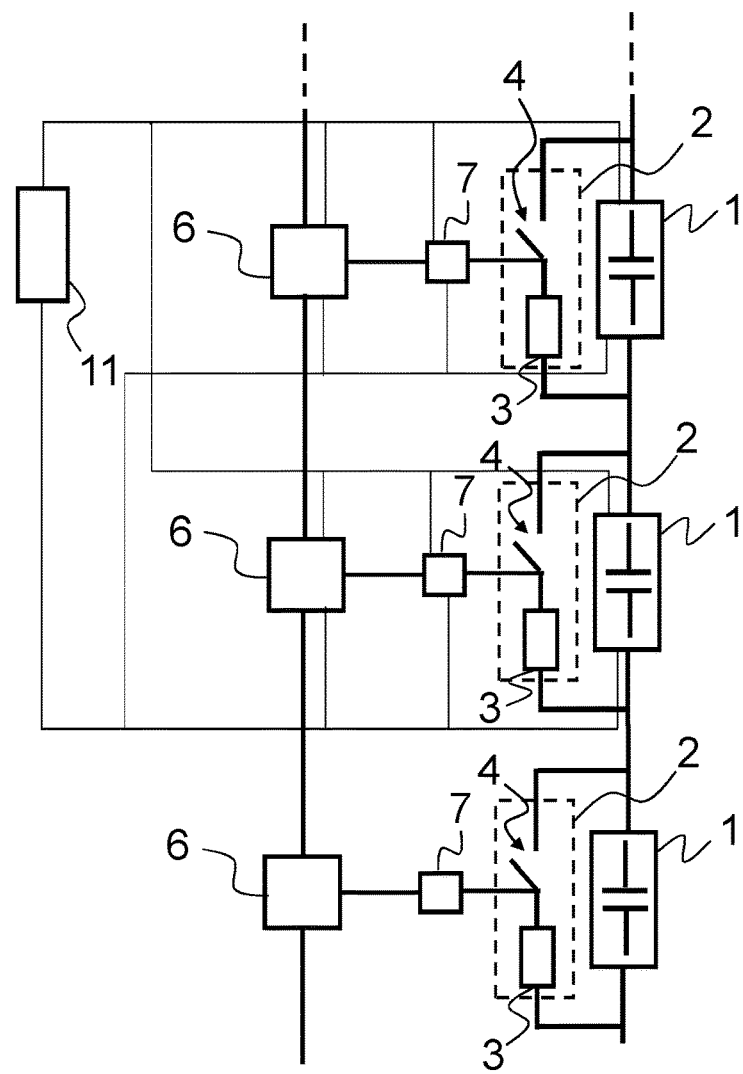
Figure 4:
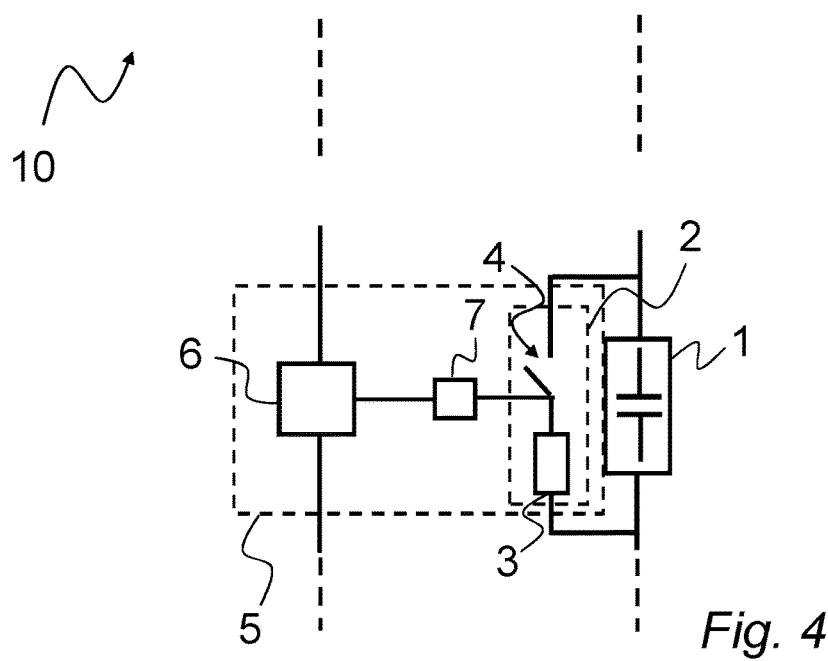
Figure 5:
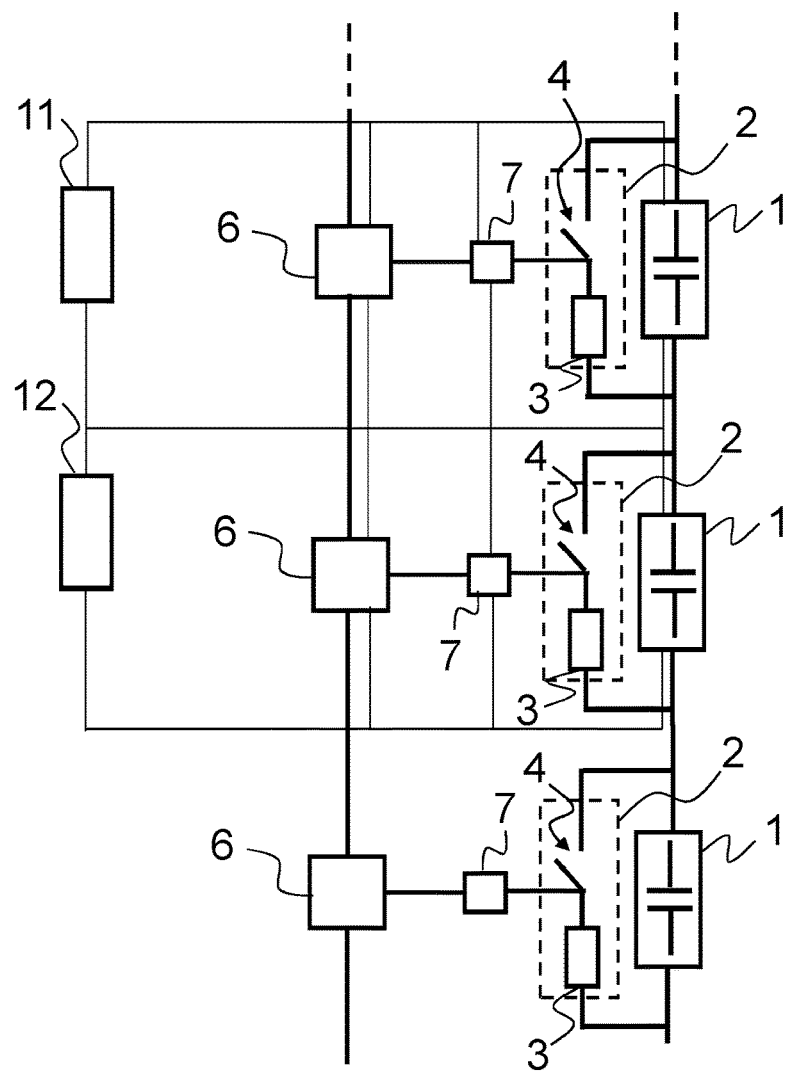
Figure 5:
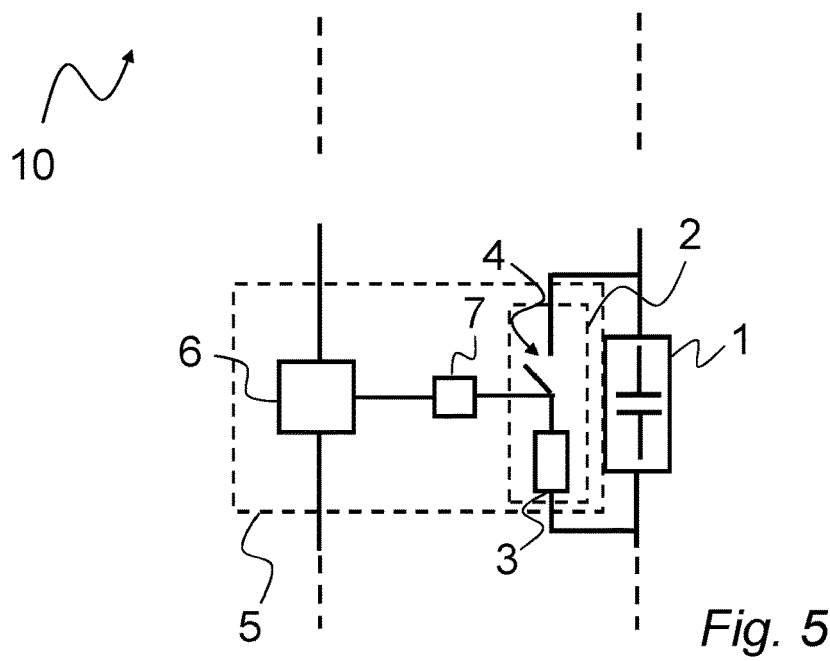
Figure 6:
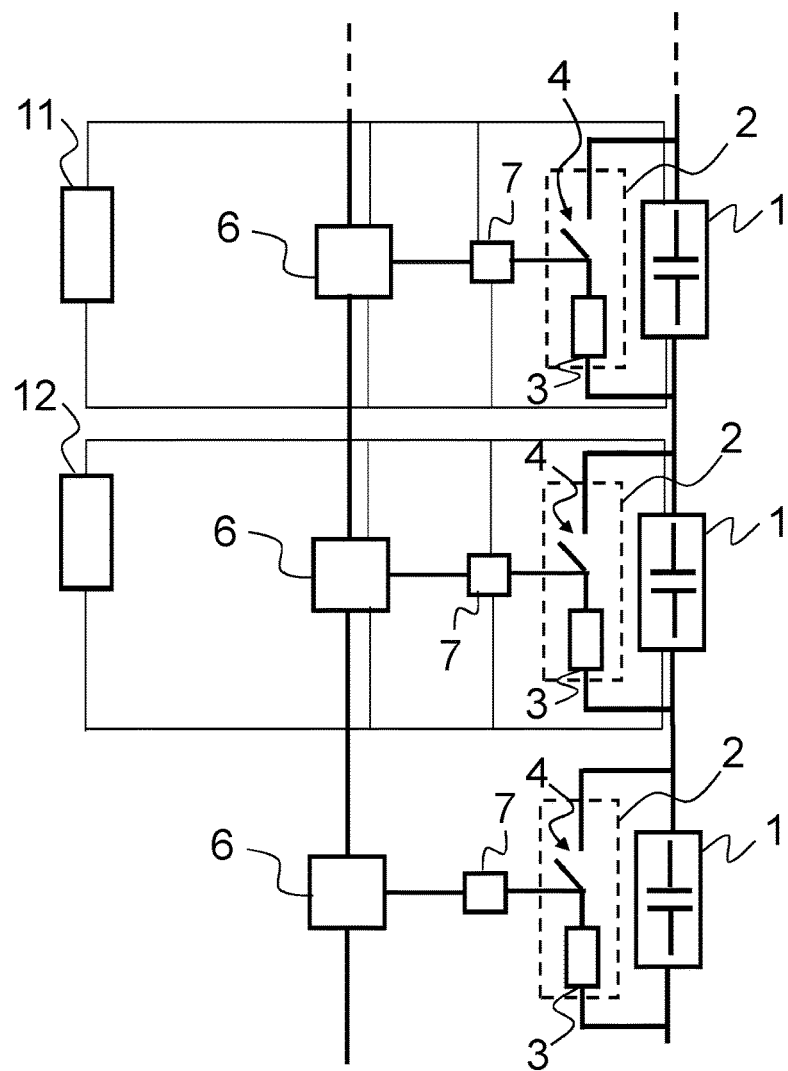
Figure 6:
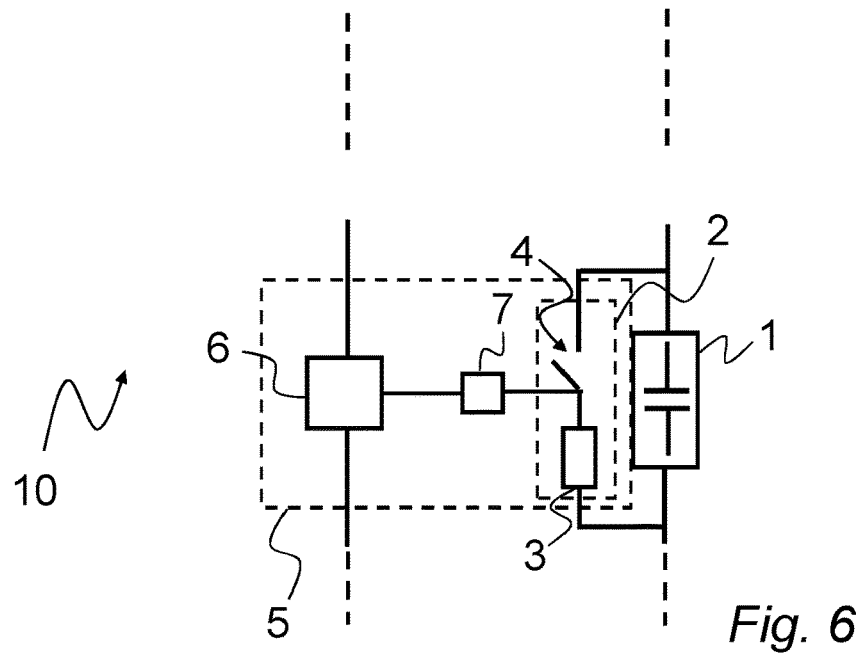

In each of FIGS. 4 to 6, such an assembly is indicated by reference numeral 5. It is to be understood that only one of the assemblies illustrated in each of FIGS. 4 and 6 is indicated by a reference numeral 5. Each of FIGS. 4 to 6 is a schematic view of an arrangement 10 according to an embodiment of the present invention. The arrangement 10 illustrated in each of FIGS. 4 to 6 is similar to the arrangement 10 illustrated in each of FIGS. 1 to 3, and the same reference numerals in the figures denote the same or similar components, having the same or similar function. Further to the description in the foregoing referring to FIG. 1, it is to be understood that only some of the assemblies 5 are depicted in FIGS. 4 to 6, as well as in FIGS. 1 to 3 (but the assemblies are not indicated by a reference numeral in FIGS. 1 to 3). It is also to be understood that the number of assemblies illustrated in the figures is according to an example, and that the arrangement 10 may comprise fewer or more assemblies than illustrated in the figures. The assemblies may possibly be referred to as cabinets, or (electrical) energy storage modules.

The arrangement 10 may comprise a plurality of auxiliary power supplies. Each auxiliary power supply may be connected to at least one of the assemblies for selectively supplying power to (at least) the energy storage unit(s) 1 of the at least one of the assemblies.

In FIG. 4 one such auxiliary power supply 11 is illustrated, while in FIGS. 5 and 6 two such auxiliary power supplies 11, 12 are illustrated. It is to be understood that the arrangement 10 in each of FIGS. 4 to 6 may comprise one or more additional auxiliary power supplies, which however are not illustrated in the figures.

There may be a difference in voltage potential of the assemblies which have a control module capable of controlling operation of a given bypass circuit to selectively bypass the corresponding energy storage unit in the series connection. Such a difference in voltage potential could possibly render direct electrical control connection between those assemblies difficult or even impossible. Embodiments of the present invention are addressing this possible issue. For example, since the assemblies may be working at different potentials, it may be difficult or infeasible to use a direct electrical link or connection between the assemblies for activating or operating the switching devices 7.

Each assembly 5 may have a potential in relation to a reference potential.

As one possibility for addressing the above-mentioned possible issue, for each bypass circuit 2, all of the assemblies 5 having a control module 6, 7 capable of controlling operation of the bypass circuit 2 to selectively bypass the corresponding energy storage unit 1 in the series connection may have the same reference potential, and those assemblies 5 may also be connected to (e.g., only to) the same auxiliary power supply 11. This possibility is illustrated in FIG. 4. Thus, the arrangement 10 may comprise a plurality of auxiliary power supplies, even though only one is illustrated in FIG. 4. Each auxiliary power supply may be connected to at least one of the assemblies 5 (e.g., to two assemblies, as illustrated in FIG. 4) for selectively supplying power to the energy storage unit(s) 1 of the at least one of the assemblies 5. For each bypass circuit 2, all of said assemblies 5 having a control module 6, 7 capable of controlling operation of the bypass circuit 2 to selectively bypass the corresponding energy storage unit 1 in the series connection and have the same reference potential are connected to the same auxiliary power supply 11. In FIG. 4, exemplifying connections between the auxiliary power supply 11 and two of the assemblies 5 are illustrated.

As another possibility for addressing the above-mentioned possible issue, for each bypass circuit 2, all of the assemblies 5 having a control module 6, 7 capable of controlling operation of the bypass circuit 2 to selectively bypass the corresponding energy storage unit 1 in the series connection may have the same reference potential, and each auxiliary power supply may be connected to a respective one of the assemblies 5 (e.g., the auxiliary power supplies may be connected to a different assemblies 5). This possibility is illustrated in FIG. 5. As illustrated in FIG. 5, each of the auxiliary power supplies 11, 12 is connected to a respective one of the assemblies 5. In FIG. 5, exemplifying connections between the auxiliary power supplies 11, 12 and two of the assemblies 5 are illustrated.

As yet another possibility for addressing the above-mentioned possible issue, for each control module 6, 7, the switching device 7 of the control module 6, 7 may comprise or be constituted by at least one solid-state relay, in order to attain isolation (e.g., a sufficient isolation) between control signaling from different control modules 6, 7 or control units 6. For example, for each or any control module 6, 7, the switching device 7 of the control module 6, 7 may comprise or be constituted by a plurality of interconnected solid-state relays, which, e.g., may be connected in parallel. In FIG. 6, exemplifying connections between the auxiliary power supply 11 with one of the assemblies 5 and between the auxiliary power supply 12 and another one of the assemblies 5, wherein the respective switching devices 7 of the control modules 6, 7 comprise or are constituted by at least one solid-state relay, are illustrated.

In conclusion, an arrangement is disclosed. The arrangement comprises a series connection of a plurality of energy storage units, a plurality of bypass circuits, each bypass circuit being configured to bypass a respective one of the energy storage units in the series connection, and a plurality of control modules, wherein each control module corresponds to a respective one of the bypass circuits. Each control module is configured to control operation of the corresponding bypass circuit and at least one other bypass circuit of the plurality of bypass circuits to selectively bypass the corresponding energy storage units in the series connection in such a way that operation of each bypass circuit of the plurality of bypass circuits to selectively bypass the corresponding energy storage unit in the series connection is controllable by means of at least two of the control modules. A related method is also disclosed.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An arrangement comprising:
    a series connection of a plurality of energy storage units;
    a plurality of bypass circuits, each bypass circuit being configured to bypass a respective one of the energy storage units in the series connection; and a plurality of control modules, wherein each control module corresponds to a respective one of the bypass circuits;

wherein each control module is configured to control operation of the corresponding bypass circuit and at least one other bypass circuit of the plurality of bypass circuits to selectively bypass the corresponding energy storage units in the series connection in such a way that operation of each bypass circuit of the plurality of bypass circuits to selectively bypass the corresponding energy storage unit in the series connection is controllable by means of at least two of the control modules.

2. An arrangement according to claim 1, wherein each control module is configured to control operation of the corresponding bypass circuit to selectively bypass the corresponding energy storage unit in the series connection on a condition that there is a fault in the energy storage unit.

3. An arrangement according to claim 2, wherein, if there is a fault in the control module and there is not a fault in at least one of the other control module(s) also capable of controlling operation of the bypass circuit to selectively bypass the corresponding energy storage unit in the series connection, the at least one other control module is configured to control operation of the bypass circuit to selectively bypass the energy storage unit in the series connection.

4. An arrangement according to claim 1, further comprising at least one fault sensor configured to sense whether there is a fault in any one of the energy storage units and/or in any one of the control modules.

5. An arrangement according to claim 1, wherein each control module comprises at least a control unit (6) and a switching device (7), wherein for each control module:
the control unit of the control module is configured to control operation of the bypass circuit corresponding to the control module to selectively bypass the energy storage unit corresponding to the bypass circuit in the series connection by means of transmitting at least one control signal to the bypass circuit;
the switching device of the control module is configured to selectively
convey any control signal, from a control unit of at least one of the other control module(s) also capable of controlling operation of said bypass circuit to selectively bypass the energy storage unit corresponding to said bypass circuit in the series connection, to said bypass circuit to control operation thereof to selectively bypass the energy storage unit corresponding to said bypass circuit in the series connection.

6. An arrangement according to claim 5, wherein for each control module:
the control unit of the control module is configured to control operation of the bypass circuit corresponding to the control module to selectively bypass the energy storage unit corresponding to the bypass circuit in the series connection by means of transmitting at least one control signal to the bypass circuit on a condition that there is a fault in the energy storage unit.

7. An arrangement according to claim 6, wherein, if there is a fault in the control unit of the control module and there is not a fault in the control unit of at least one of the other control module(s) also capable of controlling operation of the bypass circuit to selectively bypass the corresponding energy storage unit in the series connection, the control unit of the at least one other control module is configured to control operation of the bypass circuit to selectively bypass the energy storage unit in the series connection by means of transmitting at least one control signal to the bypass circuit via the switching device of the control module corresponding to said bypass circuit.

8. An arrangement according to claim 5, wherein for each control module, the switching device of the control module comprises or is constituted by at least one electromechanical relay and/or at least one solid-state relay.

9. An arrangement according to claim 5, further comprising at least one fault sensor configured to sense whether there is a fault in any one of the energy storage units and/or in any one of the control units.

10. An arrangement according to claim 1, wherein the series connection of the plurality of energy storage units form a succession of energy storage units;
wherein, for each control module:
the at least one other bypass circuit which the control module is configured to control operation of, is or are the bypass circuit(s) corresponding to energy storage unit(s) immediately preceding and/or immediately following the energy storage unit in the succession of energy storage units that is corresponding to the bypass circuit which corresponds to the control module.

11. An arrangement according to claim 1, wherein for each energy storage unit, the energy storage unit, the bypass circuit corresponding to said energy storage unit and the control module corresponding to said bypass circuit define an assembly (5) of the arrangement, such that the arrangement comprises a plurality of assemblies, each assembly comprising an energy storage unit, a bypass circuit and a control module, wherein each assembly has a potential in relation to a reference potential;
wherein for each bypass circuit, all of the assemblies having a control module capable of controlling operation of the bypass circuit to selectively bypass the corresponding energy storage unit in the series connection have the same reference potential.

12. An arrangement according to claim 11, further comprising a plurality of auxiliary power supplies, each auxiliary power supply being connected to at least one of the assemblies for selectively supplying power to the energy storage unit (s) of the at least one of the assemblies, wherein for each bypass circuit, all of said assemblies having a control module capable of controlling operation of the bypass circuit to selectively bypass the corresponding energy storage unit in the series connection and have the same reference potential are connected to the same auxiliary power supply.

13. An arrangement according to claim 11, further comprising a plurality of auxiliary power supplies, each auxiliary power supply being connected to a respective one of the assemblies.

14. A method in an arrangement comprising a series connection of a plurality of energy storage units, a plurality of bypass circuits, each bypass circuit being configured to bypass a respective one of the energy storage units in the series connection, and a plurality of control modules, wherein each control module corresponds to a respective one of the bypass circuits, the method comprising:

each control module controlling operation of the corresponding bypass circuit and at least one other bypass circuit of the plurality of bypass circuits to selectively bypass the corresponding energy storage units in the series connection in such a way that operation of each bypass circuit of the plurality of bypass circuits to selectively bypass the corresponding energy storage unit in the series connection is controllable by means of at least two of the control modules.

* * * * *